United States Patent [19]

Höhl et al.

[11] 4,431,472

[45] Feb. 14, 1984

[54] METHOD FOR IMPROVING THE ADHESION OF ORGANOPOLYSILOXANE ELASTOMERS

[75] Inventors: Horst Höhl; Peter Kochs, both of Munich, Fed. Rep. of Germany

[73] Assignee: Wacker-Chemie GmbH, Munich, Fed. Rep. of Germany

[21] Appl. No.: 453,660

[22] Filed: Dec. 27, 1982

[30] Foreign Application Priority Data

Mar. 17, 1982 [DE] Fed. Rep. of Germany ....... 3209755

[51] Int. Cl.³ ................................................. C09J 5/02
[52] U.S. Cl. ............................ 156/307.3; 106/287.15; 156/315; 156/326; 156/329; 427/407.1; 428/447; 528/901
[58] Field of Search ...................... 156/307.3, 326, 315, 156/329; 427/407.1; 106/287.15; 528/901; 428/447

[56] References Cited

U.S. PATENT DOCUMENTS

| | | | |
|---|---|---|---|
| 3,022,196 | 2/1962 | Jenkins et al. | 156/329 |
| 3,317,369 | 5/1967 | Clark et al. | 428/447 |
| 3,816,164 | 6/1974 | Pepe et al. | 427/407.1 |
| 3,819,563 | 6/1974 | Takago et al. | 528/901 |
| 4,243,718 | 1/1981 | Murai et al. | 156/329 |
| 4,332,844 | 6/1982 | Hamasa et al. | 156/329 |

Primary Examiner—John J. Gallagher

[57] ABSTRACT

A method for improving the adhesion of organopolysiloxane elastomers to solid substrates which comprises (1) coating the substrate with a primer composition containing (a) a mixture consisting of a silane having an SiC-bonded aliphatic multiple bond and a silane having an SiC-bonded epoxy group; or (b) a stratum consisting of (i) at least a partially crosslinked organopolysiloxane containing $SiO_{4/2}$ units, trimethylsiloxane units and vinyldimethylsiloxane units and (ii) at least a partially crosslinked organopolysiloxane elastomeric coating over said stratum, in which the organopolysiloxane elastomer is obtained from an organopolysiloxane composition which is stable under anhydrous conditions, but crosslinks when exposed to moisture at room temperature, (2) applying a crosslinkable organopolysiloxane composition over said primer, in which the crosslinkable organopolysiloxane composition contains a diorganopolysiloxane, a crosslinking agent, a catalyst and at least one additional component, in which the component is flowable after the composition has crosslinked and/or a rod-shaped copolymer obtained from the copolymerization of styrene and n-butylacrylate in the presence of a diorganopolysiloxane by means of free radicals.

8 Claims, No Drawings

METHOD FOR IMPROVING THE ADHESION OF ORGANOPOLYSILOXANE ELASTOMERS

The present invention relates to a method for improving the adhesion of organopolysiloxane elastomers, particularly to a method for improving the adhesion of organopolysiloxanes which crosslink at room temperature and more particularly to primer compositions for improving the adhesion of crosslinkable organopolysiloxanes.

BACKGROUND OF THE INVENTION

Silicone elastomers have been bonded to various substrates by coating the substrates with various silanes such as alkylacyloxysilanes, alkylalkoxysilanes, alkoxyacyloxysilanes or vinyltriacyloxysilanes prior to the application of the crosslinkable organopolysiloxanes.

U.S. Pat. No. 2,979,420 to Harper discloses applying a silane of the formula $RSi(OZ)_3$, where R is a phenyl or an aliphatic hydrocarbon having less than 4 carbon atoms and Z is an acyl radical having less than 4 carbon atoms to a masonry substrate and thereafter applying a room temperature curable silicone rubber to the coated substrate.

U.S. Pat. No. 3,306,800 to Plueddemann discloses a method for bonding a room temperature vulcanizable organopolysiloxane to a thermoplastic resin by coating the thermoplastic resin with a silylated polymethylmethacrylate bonding agent and then applying a vulcanizable organopolysiloxane to the coated thermoplastic resin.

U.S. Pat. No. 3,505,099 to Neuroth discloses bonding a vulcanizable organopolysiloxane composition obtained from the polymerization of organic monomers in the presence of an organopolysiloxane and a free radical generator to a metal substrate by first applying a zinc dust primer to the metal substrate, then applying an acyloxysilane to the zinc dust primer and thereafter applying the vulcanizable organopolysiloxane composition to the coated substrate.

U.S. Pat. No. 4,133,938 to Bingham discloses a method for bonding silicone elastomers to a porous substrate, which comprises coating the substrate with a composition obtained from the reaction of an acrylate with an acryloxyalkylalkoxysilane in the presence of a free radical generator and thereafter applying an organopolysiloxane which is crosslinkable at ambient temperature.

One object of this invention is to provide a method for improving the adhesion of organopolysiloxane elastomers to substrates. Another object of this invention is to provide a method for improving the adhesion of organopolysiloxanes which are crosslinked at room temperature to solid substrates. Still another object of the present invention is to provide a method for improving the adhesion of organopolysiloxane elastomers to substrates which are exposed to water. A further object of the present invention is to provide a method for improving the adhesion of organopolysiloxane elastomers to substrates which are exposed to water containing living organisms.

SUMMARY OF THE INVENTION

The foregoing objects and others which will become apparent from the following description are accomplished in accordance with this invention, generally speaking, by providing a method for improving the adhesion of organopolysiloxane elastomers to substrates which comprises (1) coating a substrate with a primer composition containing (a) a mixture consisting of a silane having an SiC-bonded aliphatic multiple bond and a silane having an SiC-bonded epoxy group; or (b) a stratum consisting of (i) at least a partially crosslinked organopolysiloxane having $SiO_{4/2}$ units, trimethylsiloxane units and vinyldimethylsiloxane units and (ii) at least a partially crosslinked organopolysiloxane elastomeric coating over said stratum, in which the crosslinked organopolysiloxane is obtained from a crosslinkable composition which is stable under anhydrous conditions, but crosslinks when exposed to moisture at room temperature and (2) applying a crosslinkable composition over said primer, in which the crosslinkable composition contains a diorganopolysiloxane, a crosslinking agent, a catalyst and at least one additional component, in which the component is flowable after the composition has crosslinked and/or the component is a rod-shaped copolymer obtained from the copolymerization of styrene and n-butylacrylate in the presence of a diorganopolysiloxane by means of free radicals.

DETAILED DESCRIPTION OF THE INVENTION

Organopolysiloxane compositions which crosslink at room temperature containing a diorganopolysiloxane, a crosslinking agent and a catalyst are generally known as "two-component compositions" or "two-component systems". In the "two-component systems", the crosslinking agent and catalyst are incorporated in the composition just prior to use.

Two-component compositions which can be crosslinked to form organopolysiloxane elastomers and which in addition to a crosslinkable diorganopolysiloxane contain a crosslinking agent, a catalyst, and a rod-shaped copolymer of styrene and n-butylacrylate, which is obtained from the copolymerization of styrene and n-butylacrylate in the presence of free radicals and a diorganopolysiloxane, have been described in the literature and are commercially available. The preparation of these compositions are described, for example, in U.S. Pat. No. 4,133,938 to Bingham; U.S. Pat. No. 3,555,109 to Getson; and U.S. Pat. No. 4,032,499 to Kreuzer et al.

It is preferred that the rod-shaped copolymers which are produced in the presence of diorganopolysiloxanes and free radical initiators, comprise between 45 and 75 percent by weight of styrene-derived units with the remainder consisting of units that are derived from n-butylacrylate.

It is preferred that the diorganopolysiloxane be present in an amount of from 20 to 60 percent by weight based on the total weight of the diorganopolysiloxane and the copolymer consisting of styrene and n-butylacrylate.

Because of their availability, it is preferred that at least 80 percent of the organic radicals in the diorganosiloxane units be methyl radicals.

It is preferred that the diorganopolysiloxane in whose presence a rod-shaped copolymer is produced from styrene and n-butylacrylate, have an average viscosity of from about 150 to 6000 mPa.s at 25° C.

The substance, which is still flowable after the organopolysiloxane composition has crosslinked, may consist of a triorganosiloxy endblocked diorganopolysiloxane which is a liquid at room temperature (British Pat. No. 1,470,465, published Apr. 14, 1977) or the flowable substance may consist of organic compounds which are devoid of metal and silicon (German Patent Application No. 2,756,495, published June 22, 1978), or mixtures of the flowable organic compounds and flowable organopolysiloxanes. Also, other two-component systems containing crosslinkable organopolysiloxane compositions consisting of triorganosiloxy endblocked diorganopolysiloxanes which are liquid at room temperature, or which contain organic compounds that remain flowable after the crosslinkable organopolysiloxanes are crosslinked, other than the rod-shaped copolymers obtained from the copolymerization of styrene and n-butylacrylate by means of free radicals in the presence of diorganopolysiloxanes are known. (See for example European Patent Application No. 0032597, published July 29, 1981).

Examples of triorganosiloxy endblocked diorganopolysiloxanes which are liquid at room temperature, are trimethylsiloxy endblocked dimethylpolysiloxanes, trimethylsiloxy endblocked methylphenylsiloxanes, trimethylsiloxy endblocked copolymers consisting of dimethylsiloxane and methylphenylsiloxane units, trimethylsiloxy endblocked copolymers of dimethylsiloxane and diphenylsiloxane units, and trimethylsiloxy endblocked copolymers of dimethylsiloxane, methylphenylsiloxane end diphenylsiloxane units.

Examples of flowable organic compounds which are free of metal and silicon are polyisobutylene having a molecular weight of about 350, technical, white mineral oil and tricresylphosphate.

The substance which is still flowable after the organopolysiloxane composition is crosslinked, is preferably present in the composition in an amount of from about 10 to 80 percent by weight, based on the total weight of the crosslinkable organopolysiloxane and the rod-shaped copolymer of styrene and n-butylacrylate, when present.

Examples of crosslinking agents which are used in the two-component compositions of this invention are polyethylsilicate having an $SiO_2$ content of from about 34 to 40 percent by weight and hexaethoxydisiloxane.

Catalysts which may be used in the two-component compositions of this invention are tin compounds such as dibutyltin dilaurate and dibutyltin acylates, in which the acylate groups are derived from a mixture of carboxylic acids containing from 9 to 11 carbon atoms per molecule and the carboxyl group is bonded to a tertiary carbon atom in at least 90 percent by weight of the acids (dibutyltin diversatate).

Silanes having an SiC-bonded aliphatic multiple bond are, for example, vinyltriacetoxysilane, vinyltriethoxysilane, vinyltrimethoxysilane, vinyltris-(beta-methoxyethyleneoxy)silane, beta-methacryloxypropyltrimethoxysilane and beta-methacryloxypropyltris-(beta-methoxyethyleneoxy)-silane.

Examples of silanes having an SiC-bonded epoxy group are gamma-glycidoxypropyltrimethoxysilane and beta-(3,4-epoxycyclohexyl)-ethyltrimethoxysilane.

It is preferred that the silane having an SiC-bonded epoxy group be employed in an amount of from 1.2 to 1.4 moles for each mole of silane having an SiC-bonded aliphatic multiple bond.

Methods for preparing coatings consisting of at least partially crosslinked organopolysiloxanes consisting of $SiO_{4/2}$ units, trimethylsiloxane units and vinyldimethylsiloxane units and the utilization of such coatings as primers are generally known and are commercially available. (See for example, the publication "Wacker Silicone" SM 12-121, 803, April 1980, pages 1 and 2).

Methods for preparing coatings from organopolysiloxane compositions which are stable under anhydrous conditions, but when exposed to atmospheric moisture at room temperature, crosslink to form elastomers, have been described in the literature and are commercially available. Among the compositions which are stable under anhydrous conditions, but which crosslink when exposed to atmospheric moisture at room temperature, are those which release acetic acid or an amine on crosslinking, such as, for example, sec-butylamine or cyclohexylamine.

In the process of this invention, it is preferred that primer (a) be employed when the organopolysiloxane compositions contain a substance which is still flowable after crosslinking.

When it is desired to improve the adhesion of organopolysiloxane elastomers on substrates when said compositions comprise a rod-shaped copolymer obtained from the copolymerization of styrene and n-butylacrylate by means of free radicals in the presence of the organopolysiloxane, then primer (b) is preferably employed.

Primers (a) and (b) can be dissolved or dispersed in an organic solvent such as toluene or in a mixture of xylene isomers. Furthermore, the two-component compositions which can be crosslinked to form an organopolysiloxane elastomer used in the process of this invention can be dissolved or dispersed in an organic solvent such as benzene.

The compositions employed in the process of this invention can be applied to the substrates by coating, pouring, spraying or calendering.

The method of this invention is especially useful in coating substrates having solid surfaces that are exposed to water containing living organisms which may grow on the coated surfaces. Examples of such surfaces are those consisting of glass, wood, plastics, such as an epoxy resin, including adhesive varnishes based on epoxide-tar, or fiberglass-reinforced polyesters, inorganic buidling materials such as concrete, metal, such as iron or steel, ship bottoms, buoys, sea mines, supports for drilling platforms or bridges, and containers such as bathtubs and pipes. Substrates treated in accordance with the method of this invention may be exposed to stationary or flowing water as well as salt water, such as ocean water.

In the following examples all parts and percentages are by weight unless otherwise specified.

EXAMPLE 1

About 72 hours after an epoxide-tar based adhesive has been applied to a steel plate, a mixture containing 1 part of vinyltriacetoxysilane and 1.3 parts of gamma-glycidoxypropyltrimethoxysilane is applied to the coating. About one hour after the application of the silane mixture, a crosslinkable composition containing a diorganopolysiloxane, a crosslinking agent, a catalyst and at least one additional component which remains flowable after the composition is crosslinked is applied to the silane coating with a bar. (The crosslinking agent and the catalyst air incorporated in the composition just prior to the application of the composition to the silane coating.) The crosslinkable composition contains:

(A) 100 parts of a mixture consisting of:
  62.5 parts of a dimethylpolysiloxane having terminal Si-bonded hydroxyl groups and a viscosity of about 1000 mPa.s at 25° C.;

62.5 parts silicon dioxide;
2 parts ferric oxide;
4 parts calcium carbonate;
20 parts of a dimethylpolysiloxane having trimethylsiloxy terminal groups and an average molecular weight of about 16,000; and (B) 3 parts of a mixture which is incorporated just prior to the application of the composition to the silane coating consisting of;
3 parts of polyethylsilicate having an SiO$_2$ content of about 34 percent; and
1 part dibutyltindiacylate, in which the acylate groups are derived from a mixture of carboxylic acids containing from 9 to 11 carbon atoms per molecule, in which the carboxyl group of at least 90 percent of the acids is bonded to a tertiary carbon atom.

Before this coating begins to crosslink, a thin strip of steel plate which has been coated with the epoxide-tar adhesive and which subsequently has been coated with the silane coating, is applied with pressure to the crosslinkable composition.

The structure obtained is then stored for 7 days at 23° C. and in a relative humidity of 50 percent. The metal strip is subsequently removed at a rate of 200 mm per minute. The resistance to shear is 125.6 N/cm$^2$.

EXAMPLE 2

A steel plate is coated with an epoxide-tar based adhesive and then after about 72 hours, a mixture consisting of the following ingredients:
10 parts of polyethylsilicate having an SiO$_2$ content of about 34 percent;
10 parts of butyltitanate;
10 parts of an organopolysiloxane consisting of SiO$_{4/2}$ units, trimethylsiloxane units and vinyldimethylsiloxane units in a molar ratio of 1:0.8:0.1,
is applied to the plate containing the adhesive coating as a 60 percent toluene solution.

After one hour an organopolysiloxane composition which is stable under anhydrous conditions, but which crosslinks when exposed to moisture at room temperature, is applied to the coated steel plate. The organopolysiloxane consists of the following ingredients:
100 parts of a dimethylpolysiloxane having terminal Si-bonded hydroxyl groups and a viscosity of about 80,000 mPa.s at 25° C.; and
20 parts of silicon dioxide having a surface area of 150 m$^2$/g, in which the silanol groups are partially substituted with trimethylsiloxy groups;
5 parts of methyltriacetoxysilane; and
0.5 parts of di-tert-butoxydiacetoxysilane.

Two hours after the composition has been applied, it is then coated with the crosslinkable composition described in Example 1 with the aid of a bar. Before the coating begins to crosslink, a thin strip of steel plate which has been coated with the adhesive, then with the organopolysiloxane-containing mixture and then with the crosslinkable organopolysiloxane composition, is pressed slightly into the coating.

After seven days of storage at 23° C. and at 50 percent relative himidity, the resistance to shear is 116 N/cm$^2$.

COMPARISON EXAMPLE

The process described in Example 1 is repeated, except that instead of the mixture containing the two silanes, a mixture containing the following ingredients:
17 parts of butyltitanate;
11 parts of tetra-n-propoxysilane;
8 parts of tetra-(methoxyethyleneoxy)-silane;
4 parts of methyltris-(methoxyethyleneoxy)-silane
as a 10 percent benzene solution is used.

After seven days of storage at 23° C. and at 50 percent humidity, the resistance to shear is 92.4 N/cm$^2$.

What is claimed is:

1. A method for improving the adhesion of organopolysiloxane elastomers which crosslink at room temperature to a substrate which comprises
   (1) coating the substrate with a primer selected from the group consisting of:
      (a) a mixture consisting of a silane having an SiC-bonded aliphatic multiple bond and a silane having SiC-bonded epoxy group; and
      (b) a stratum consisting of (i) at least a partially crosslinked organopolysiloxane containing SiO$_{4/2}$ units, trimethylsiloxane units and vinyldimethylsiloxane units and (ii) at least a partially crosslinked organopolysiloxane elastomeric coating over said stratum, in which the organopolysiloxane elastomer is obtained from an organopolysiloxane composition which is stable under anhydrous conditions, but crosslinks when exposed to moisture at room temperature; and thereafter
   (2) applying a crosslinkable organopolysiloxane composition over said primer in which the crosslinkable organopolysiloxane composition contains a diorganopolysiloxane, a crosslinking agent, a catalyst and at least one additional component, in which the component is selected from the group consisting of (c) a material which is flowable after the organopolysiloxane composition is crosslinked, (d) a rod-shaped copolymer obtained from the copolymerization of styrene and n-butylacrylate in the presence of a diorganopolysiloxane by means of free radicals and (e) mixtures thereof.

2. The method of claim 1, wherein the primer is a mixture consisting of a silane having an SiC-bonded aliphatic multiple bond and a silane having SiC-bonded epoxy groups.

3. The method of claim 1, wherein the silane having an SiC-bonded epoxy group is present in an amount of from 1.2 to 1.4 moles per mole of silane having an SiC-bonded aliphatic multiple bond.

4. The method of claim 1, wherein the primer is a stratum consisting of (i) at least a partially crosslinked organopolysiloxane containing SiO$_{4/2}$ units, trimethylsiloxane units and vinyldimethylsiloxane units and (ii) at least a partially crosslinked organopolysiloxane elastomeric coating over said stratum, in which the organopolysiloxane elastomer is obtained from an organopolysiloxane composition which is stable under anhydrous conditions, but crosslinks when exposed to moisture at room temperature.

5. The method of claim 1, wherein the organopolysiloxane elastomer (ii) is obtained from an organopolysiloxane which crosslinks at room temperature when exposed to moisture and releases acetic acid.

6. The method of claim 1, wherein the organopolysiloxane elastomer (ii) is obtained from an organopolysiloxane which crosslinks at room temperature when exposed to moisture and releases an amine.

7. The method of claim 1, wherein the component is flowable after the organopolysiloxane is crosslinked.

8. The method of claim 1, wherein the component is a rod-shaped copolymer obtained from the copolymerization of styrene and n-butylacrylate in the presence of a diorganopolysiloxane by means of free radicals.

* * * * *